United States Patent [19]

Takahashi et al.

[11] Patent Number: 4,953,592
[45] Date of Patent: Sep. 4, 1990

[54] SELF-SEALING COUPLING WITH BYPASS FOR HYDRAULIC CIRCUIT

[75] Inventors: Hiroyuki Takahashi, Tokyo; Toshiaki Kurashima, Okayamaken, both of Japan

[73] Assignees: Sanyo Kiki Kabushiki Kaisha, Okayamaken; Yokohama Aeroquip, Tokyo, both of Japan

[21] Appl. No.: 390,039

[22] Filed: Aug. 7, 1989

[30] Foreign Application Priority Data

Mar. 25, 1989 [JP] Japan ................ 1-34092[U]

[51] Int. Cl.⁵ .............................. F16L 37/28
[52] U.S. Cl. .................. 137/599.1; 91/432; 137/614.04
[58] Field of Search ............ 137/599.1, 614.04; 91/432

[56] References Cited

U.S. PATENT DOCUMENTS

4,371,004 2/1983 Sysolin ............ 137/614.04 X

FOREIGN PATENT DOCUMENTS

1425583 4/1970 Fed. Rep. of Germany ............ 137/614.04
63-163688 10/1987 Japan .

*Primary Examiner*—Robert G. Nilson
*Attorney, Agent, or Firm*—Lowe, Price, LeBlanc, Becker & Shur

[57] ABSTRACT

In a self-sealing coupling with a bypass for a hydraulic circuit designed to connect a hydraulic sub-circuit to a midway portion of a main circuit of a hydraulic device, there is provided a coupling body with an input passage, an output passage, an input passage side and an output passage side self-closing valves and a bypass valve. The bypass valve is provided with a cylindrical valve element which is reciprocatively slidable within either one of said input passage and said output passage so as to open and close that one passage relative to a bypass provided therebetween. The cylindrical valve element is adapted to be moved together with the self-closing valve element provided in the one passage, to be shifted to a bypass valve opening position where the bypass is opened by the cylindrical valve element valve closed condition. This causes the one self-closing valve element to be pushed outwardly by a valve closing force exerting means, to close the one self-closing valve port and to be shifted to a bypass valve closing position where the bypass is closed by the cylindrical valve element in a valve opened condition the one self-closing valve element in this condition can be pushed back inwardly by an external force so as to open the one self-closing valve port. The valve opening and closing stroke of the one self-closing valve element and the cylindrical valve element is selected to be larger than the corresponding stroke of the other.

7 Claims, 8 Drawing Sheets

SELF-SEALING COUPLING WITH BYPASS FOR HYDRAULIC CIRCUIT

BACKGROUND OF THE INVENTION

1. Field of the Invention

The present invention relates generally to a self-sealing coupling for use in connection and disconnection of a hydraulic sub-circuit to a midway portion of a main circuit of a hydraulic device in tandem, and more specifically to a self-sealing coupling with a bypass for a hydraulic circuit in which a flow of pressurized oil is detoured to the sub-circuit by closing of the bypass for blocking off of the midway portion of the main circuit under the connected condition or, optionally, the flow being directly supplied to the main circuit by opening of the bypass in a disconnected condition.

2. Background of the Prior Art

For example, when an operator mounts or dismounts an agricultural loader onto an agricultural tractor, a hydraulic sub-circuit provided on the side of the loader is adapted to be connected in tandem to a midway portion of a main circuit of a hydraulic device provided on the side of the tractor. Thereupon, a self-sealing coupling with a bypass for a hydraulic circuit is interposed in the tandem connection portion between the main circuit and the sub-circuit.

When the agricultural tractor is used for the cultivation of land, usually the agricultural loader is removed from the tractor. For removing the loader, the bypass within the self-sealing coupling is opened by the operator so that a link hitch of a three-point support type can be hydraulically actuated.

When the operator uses the tractor equipped with external hydraulic implement and machinery such as the agricultural loader and the like, the bypass is blocked off so that the oil to be supplied to the main circuit is detoured to the sub-circuit.

Generally, a conventional self-sealing coupling with a bypass for a hydraulic circuit having relation to the present invention is constituted as follows.

A coupling body is provided with an input passage and an output passage separately from each other. In the outlet portion of the input passage and in the inlet portion of the output passage, there are provided respective valves on the main circuit.

Each self-closing valve is adapted to close a valve port thereof with a self-closing valve element urged outward by a valve closing force exerting means, and each valve element is adapted to be pushed back inwardly by an external force so as to open the valve port.

The input passage and the output passage are adapted to be interconnected through a bypass opened and closed by means of a bypass valve.

Figures 8, 9:
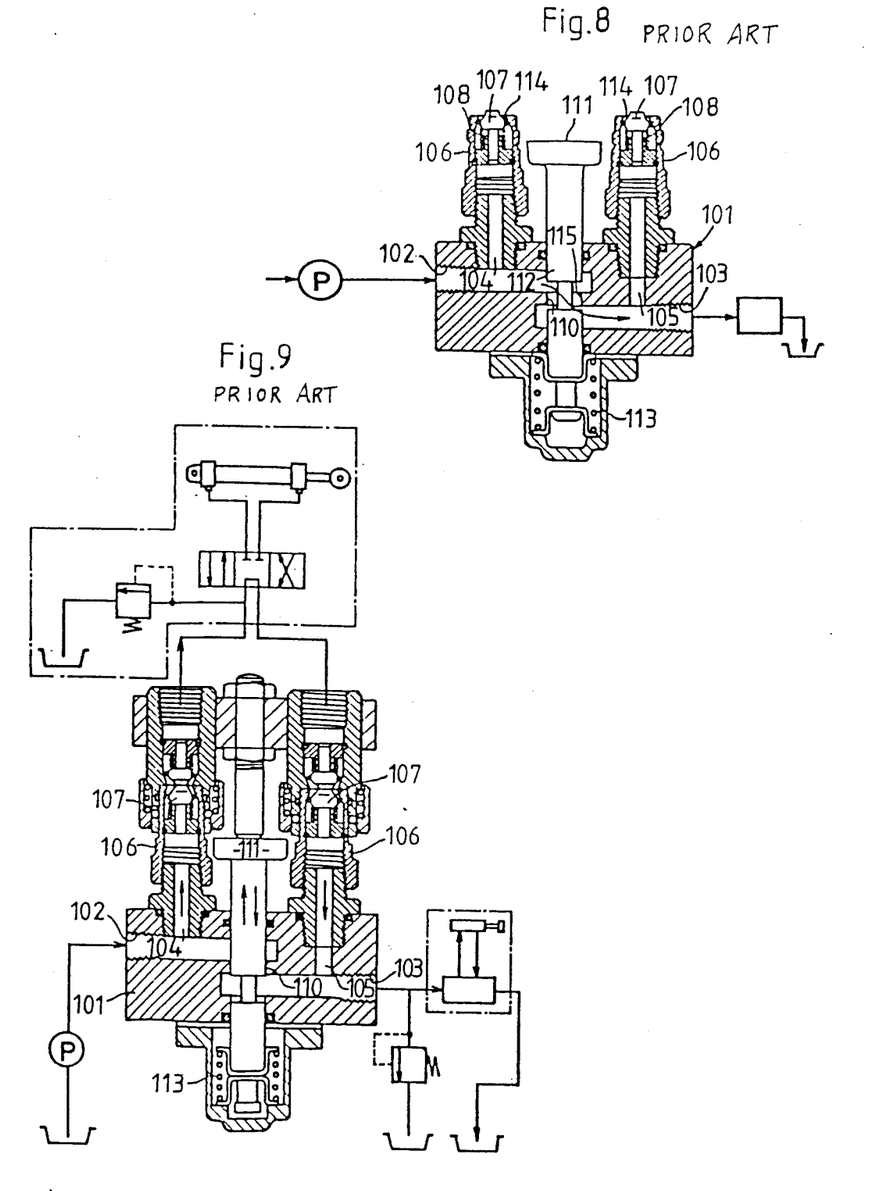
FIG. 8 is a view corresponding to FIG. 1 in a disconnected condition.
FIG. 9 is a view corresponding to FIG. 2 in a connected condition.

A first example of prior art is the embodiment shown in FIGS. 1 and 2 of Japanese Laid Open Utility Model Publication No. 1987-163688.

In the accompanying drawings of FIGS. 8 and 9 showing the first conventional embodiment, a block-like coupling body 101 is provided on its upper side with a pair of self-closing valves 106, 106 secured to body 101 side by side. Within each self-closing valve 106, there is provided a self-closing valve element 107 which is urged toward the valve closing position by means of a valve closing spring 108. The coupling body 101 is further provided with an input passage 102 opened in one side and with an output passages 103 opened in the other side thereof. These input passage 102 and output passage 103 are disposed horizontally and are spaced apart vertically, and are interconnected by a vertical bypass 110 formed in the middle portion of the coupling body 101.

A cylindrical bypass valve 111 is disposed through the vertical middle portion of the coupling body 101 and is passed vertically and slidably through the bypass 110. The bypass valve 111 is adapted to be urged upward by means of a valve opening spring 113 provided in the lower portion of the coupling body 101 so as to open the bypass 110.

However, there are the following problems associated with the first example:

(a) Since the coupling body 101 is provided separately with the self-closing valves 106 and the bypass valve 111 and further provided separately with the valve closing spring 108 as the urging means for the self-closing valve 107 and the valve opening spring 113 as the urging means for the bypass valve 111, the general constitution has to be larger and more complicated.

(b) Since the coupling connection portion on the main circuit side is provided with the similar self-closing valves 106, 106 for the input side as well as for the output side, operator tends to make the connection mistakes for the input sides and the output sides respectively on the side of the sub-circuit as well as on the side of the main circuit when connecting the self-closing valves on the side of the sub-circuit to the self-closing valves 106, 106 on the side of the main circuit. It is therefore possible that a loader and the like provided in the output portion of the sub-circuit could be driven in a reverse direction, which might cause an accident, due to such connection mistakes.

Figure 10:
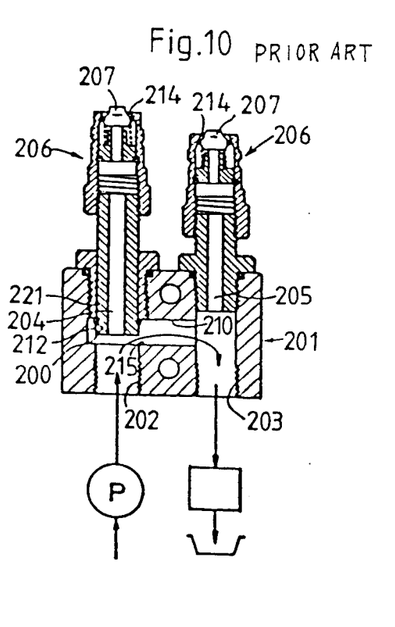
FIG. 10 is a view corresponding to FIG. 1 in a disconnected condition.
Figure 11:
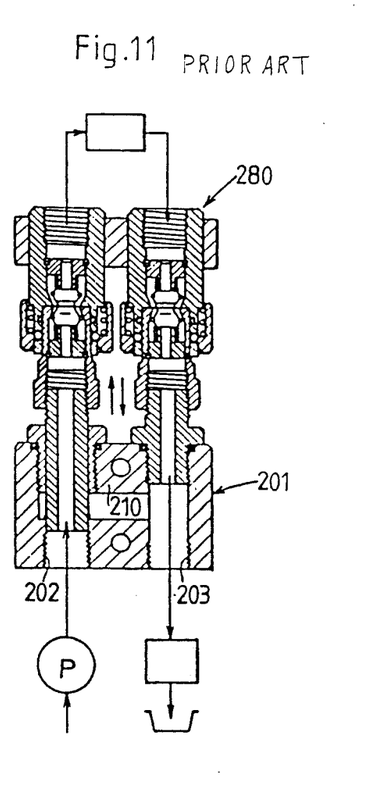
FIG. 11 is a view corresponding to FIG. 2 in a connected condition.

A second example of known art is obtained by simplifying the constitution provided in the first conventional embodiment, as shown in FIGS. 5 and 6 of the above-mentioned Publication.

In the related accompanying drawings of FIGS. 10 and 11, a coupling body 201 is provided with an input passage 202 and an output passage 203 which are disposed vertically therethroughout 201. A pair of self-closing valves 206, 206 are fitted side by side into the input passage 202 and into the output passage 203 from above respectively. One of them is fitted vertically and slidably into the input passage 202 with its cylindrical lower portion 200 facing a holizontal bypass 210. The other one, for the output passage 203, is threadably secured to the coupling body 201.

In such structure, under the "disconnected" and "self-closed" condition of the coupling for using only the main condition of the coupling for using only the main circuit of the hydraulic device, the self-closing valve 206 is adapted to be pushed up by means of an oil pressure within the "input passage 202 so as to open the bypass 210. Under the "connected" and "self-open" condition of the coupling for using the sub-circuit, a duplex coupling provided in the leading end of the sub-circuit is adapted to be pushed into the paired self-closing valves 206, 206 provided in the coupling body 201 and the self-closing valve 206 on the input passage side is lowered so as to close the bypass 210.

In this second example, the cylindrical lower portion 200 of the self-closing valve 206 on the input passage side serves as a bypass valve element 212 also, and an oil pressure within the input passage 202 acts as a valve opening force exerting means. Accordingly, the self-closing valve 206 serves as the bypass valve 211 also so that a valve for the exclusive use of the bypass can be omitted and the general constitution of the hydraulic device can be simplified.

However there are the following associated with the second example:

(a) Since the self-closing valve 206 on the input passage side is adapted to be raised and lowered vertically, a duplex connection coupling 280 on the sub-circuit side is secured only to the self-closing valve 206 on the output passage side of the coupling body 201 in an unstable cantilevered state when the sub-circuit is used.

Accordingly, when the self-closing valve 206 on the input passage side is extended or retracted by means of an external force such as a tension force or a pushing force transmitted through an oil supply hose, the force exerted to the self-closing valve 206 on the input passage side acts so as to bend the self-closing valve 206 on the output passage side. As a result, it is possible that the self-closing valve 206 on the output passage side could be deformed by a stress concentration, so that an oil leak is caused or the valve 206 is damaged during a long term use.

(b) The input side and the output side may be distinguished readily because the self-closing valve 206 on the input passage side is projected outward farther than that on the output passage side before being connected.

However, since similar self-closing valves 206, 206 are used for both the input passage side and the output passage side, one of the self-closing valves 206, 206 provided on the main circuit side is connectable to either of self-closing valves on the input side and on the output side provided on the sub-circuit side. Therefore, it is still possible that an operator could make a connection mistake similar to that possible in the above-mentioned first example.

SUMMARY OF THE INVENTION

It is an object of the present invention to provide a self-sealing coupling with a bypass for a hydraulic circuit which is simple structurally simple and durable, which can be changed over readily to a connection mode with a hydraulic sub-circuit, and can facilitate a coupling connection and which can prevent a connection mistake.

For accomplishing this object, the present invention includes a basic self-sealing coupling with a bypass for a hydraulic circuit having a structure as previously above but which improves the coupling as follows.

That is, the bypass valve is provided with a cylindrical valve element which is reciprocatively slidable within either passage of the input passage or the output passage so as to open and close a communication hole provided between said passage and the bypass.

The cylindrical valve element is adapted to move together with the self-closing valve element provided in said passage. Under the valve closed condition in which said self-closing valve element is pushed out outward by the valve closing force exerting means so as to close the self-closing valve port, the cylindrical valve element is shifted to a bypass valve opening position where the communication hole is opened. Under the valve opened condition in which said self-closing valve element is pushed back inwardly by an external force so as to open the self-closing valve port, the cylindrical valve element is shifted to a bypass valve closing position where the communication hole is closed.

The valve opening and closing strokes of said self-closing valve element are selected to be larger than those of the cylindrical valve element.

Accordingly, the present invention functions as follows.

Figure 1:
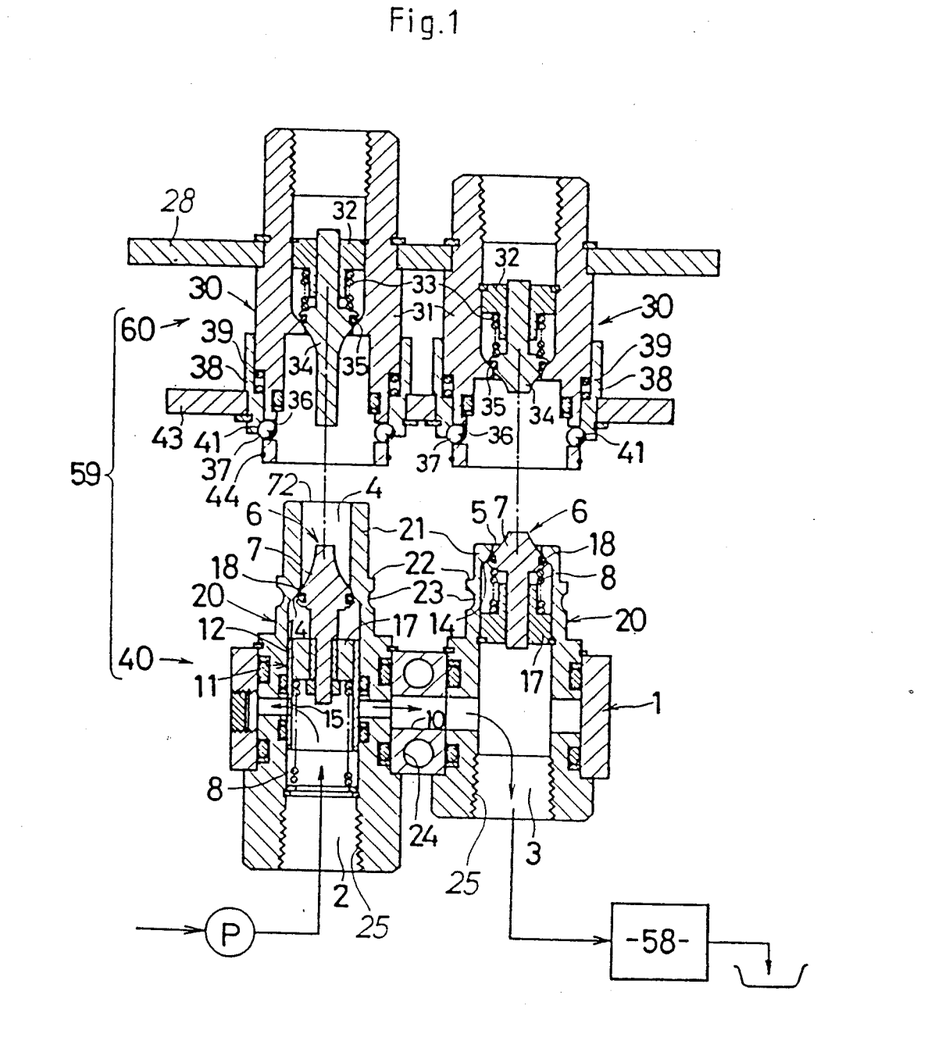
FIG. 1 is a vertical sectional front view showing a self-sealing coupling with a bypass for a hydraulic circuit of a first preferred embodiment in its disconnected condition.

(a) As shown in FIG. 1 illustrating a preferred embodiment of the present invention, under the coupling disconnected and self-closed condition, the valve elements 7 of the self-closing valves 6 provided in both passages 2, 3 are urged by the valve closing force exerting means 8, e.g., a compressed spring so that the self-closing valve ports 14 can be closed, the communication hole 15 can be opened by the cylindrical valve element 12 of the bypass valve 11 and said passages 2, 3 can be communicated to the bypass 10.

Accordingly, the pressure oil flows only to the main circuit from the input passage 2 of the coupling body 1 through the bypass 10 and the output passage 3 thereof in the bypass mode.

Figure 2:
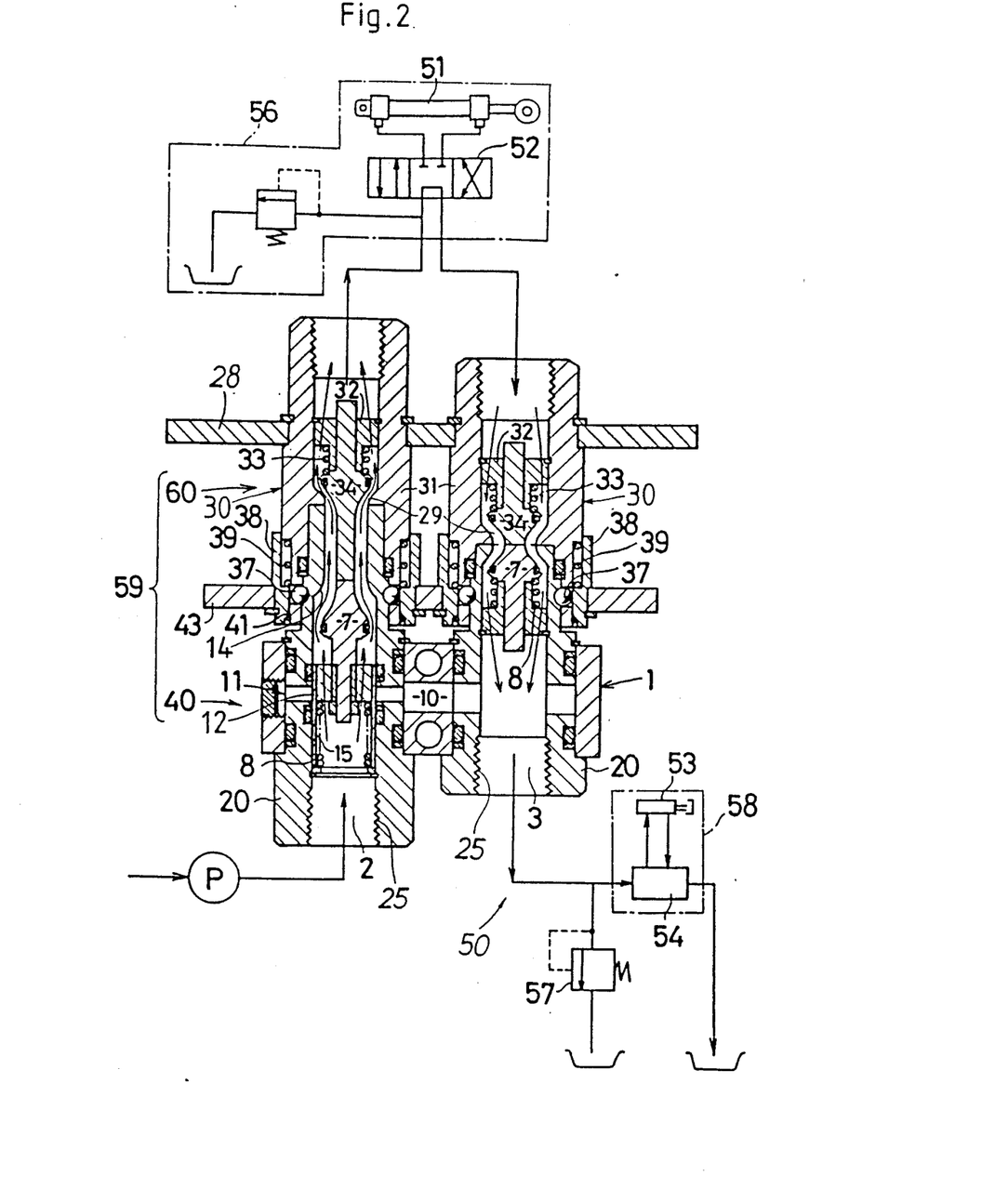
FIG. 2 is a vertical sectional view showing the self-sealing coupling in its connected condition.

(b) As shown in FIG. 2 illustrating the same embodiment, under the coupling connected and self-opened condition in which the coupling on the sub-circuit is connected to the self-closing valves 6 on the side of the coupling body 1 so as to connect the sub-circuit to the main circuit of the hydraulic device, the valve elements 7 of the self-closing valves 6 provided in both passages 2, 3 are pushed inwardly by the external force transmitted through the sub-circuit side coupling against the valve closing force exerting means 8 so that the self-closing valve ports 14 can be opened, the communication hole 15 can be closed by the cylindrical valve element 12 of the bypass valve 11 and the bypass 10 can be shut off from said passages 2, 3.

Accordingly, the pressure oil flows to the sub-circuit and then to the main circuit in tandem from the input passage 2 of the coupling body 1, namely through the outlet portion 4 (the self-closing valve port 14) of the input passage 2, the sub-circuit, the inlet portion 5 (the self-closing valve port 14) of the output passage 3 and the output passage 3.

Figure 3:
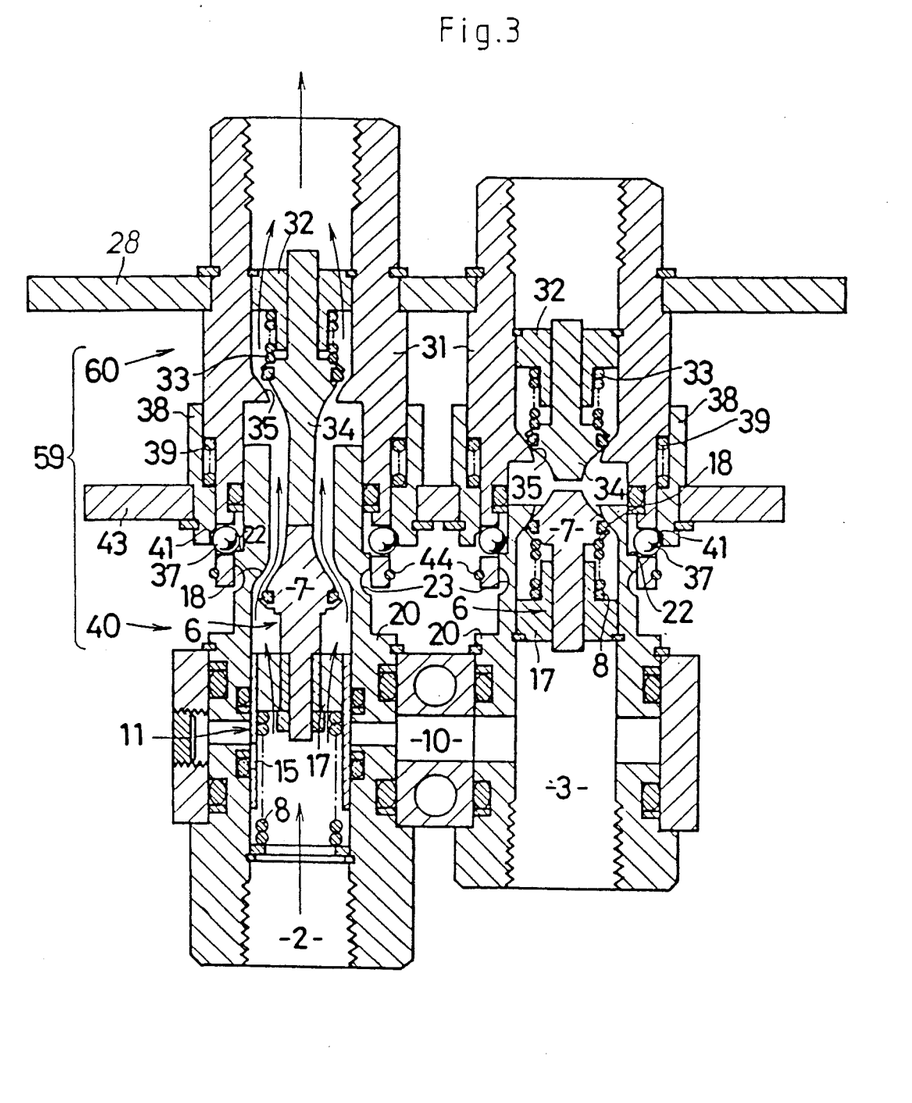
FIG. 3 is a vertical sectional front view showing the self-sealing coupling in the process of connection.

(c) As shown in FIG. 3 illustrating the same embodiment, in the process of coupling the connection, one of the self-closing valves 7 is pushed back largely inwardly so that, firstly, the valve port 14 corresponding thereto is opened and then the other valve port 14 is opened.

Thereupon, for example, the following become possible.

(c-1) In the case that the main circuit is in a free state, wherein an oil can flow therethrough, since the oil within the input passage 2 and within the output passage 3 is released first from one valve port 14 and then through the other valve port 14 at least to the oil passage of the main circuit, the respective self-closing valve elements 7 can be pushed back smoothly and the coupling on the sub-circuit side can be readily connected to the main circuit side with a small pushing force.

(c-2) In the case that the main circuit is blocked off by a pressure oil pump and a flow changeover valve so as to prevent an oil from flowing therethrough and the sub-circuit is in a free state, since the oil within the input passage 2 and within the output passage 3 is released to the oil passage of the sub-circuit, the coupling on the sub-circuit side can be readily connected to the main circuit side with a small pushing force.

Therefore, there are obtained the following advantages associated with the present invention:

(a) Since the self-closing valve also serves as the bypass valve element and the valve closing force exerting means for the self-closing valve also serves as the opening and closing means for the bypass, it is not necessary to provide two different kinds of valves, namely the self-closing valve and the bypass valve separately. Thus, in contrast to the known devices, the self-sealing coupling according to this invention can be made compact and simple in structure.

(b) Since either of the self-closing valve port and the input passage (or the output passage) to be connected with the coupling on the sub-circuit side are maintained stationary so as not to be removed at the time of connection between the sub-circuit and the main circuit, the self-closing valve can be prevented from being deformed by a stress concentration and from thereby causing an oil leak. This invention thus differs from the second Prior Art example previously described in which one self-closing valve is secured in a cantilevered state, and the couplings on both sides can be connected strongly and reliably.

(c) In the process of making a coupling connection, since the oil remaining within the input passage and within the output passage respectively is released rapidly to the oil passage of the main circuit, or the sub-circuit so that the self-closing valves are pushed back smoothly into both passages respectively. The oil never acts as a resistance against the pushing back of the self-closing valve element. Consequently, both the couplings can be connected readily with each other.

(d) Since the valve opening and closing stroke of the one self-closing valve element and the cylindrical valve element is selected to be larger than that of the other self-closing valve element, the forms of the self-closing valve elements on the input passage side and on the output passage side have to be different from each other (for example, the self-closing valves themselves or the fitting portions comprising the outer cases of the self-closing valves are different in lengths on the input passage side and on the output passage side). Therefore, since it becomes impossible to connect both self-sealing couplings on the sub-circuit side to the main circuit side if the respective input sides and the respective output sides on the sub-circuit side and on the main circuit side are not set correctly each other, connection mistakes for the input side and the output side between both circuits can be prevented readily.

Figure 6:
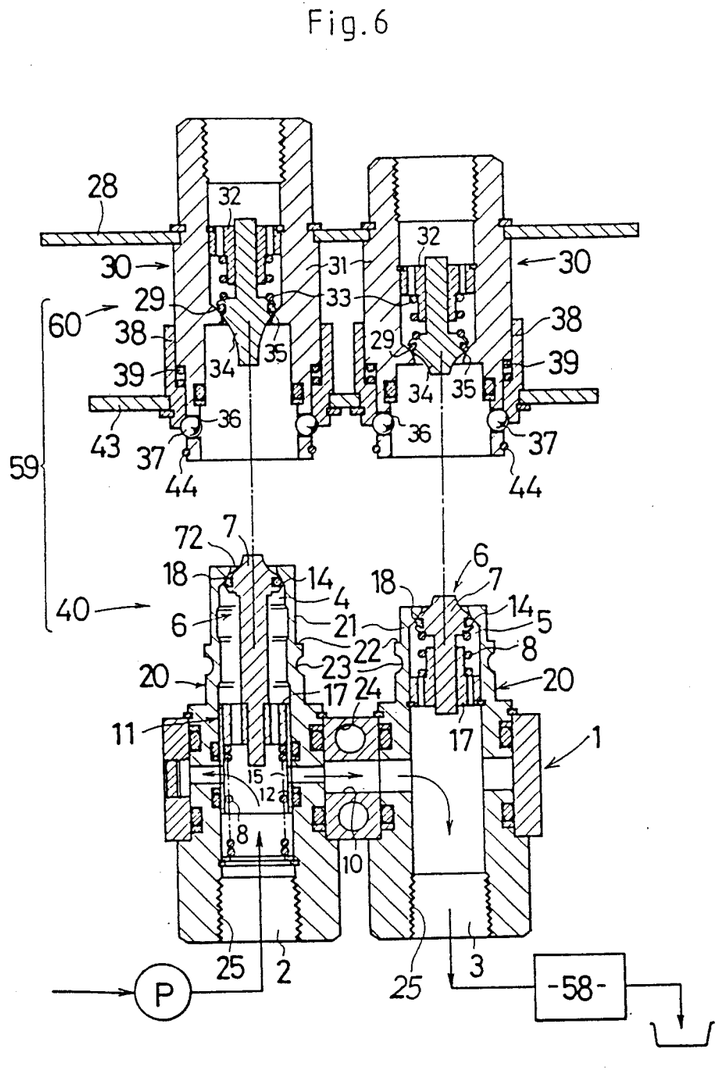
FIG. 6 is a view showing a third embodiment corresponding to FIG. 1.

(e) As shown in FIG. 6, when the respective openings 72, 73 of the connection leading ends of the input passage 2 and the output passage 3 are positioned near the valve ports 14 of the respective self-closing valve 6 on the main circuit side, for example when the self-sealing coupling is separated from the sub-circuit for using only the main circuit for an agricultural work, dust and dirt such as chips of straw, mud and so on are not readily attached and accumulated to the openings 72, 73 and dirt can be removed soon and readily by wiping off. The self-closing valves 6 normally are kept closed at their leading ends, namely at their valve openings, so as to seal their insides.

Even if dust and dirt does enter the insides of the self-closing valves 6, it can do so in a very limited way.

BRIEF DESCRIPTION OF THE DRAWINGS

FIGS. 1 through 7 show the embodiments of the different present invention;

FIGS. 8 and 9 show a first known device. FIGS. 10 and 11 show a second known device.

DESCRIPTION OF THE PREFERRED EMBODIMENTS

Now, the preferred embodiments of the present invention will be explained with reference to the accompanying drawings hereinafter.

Figure 4:
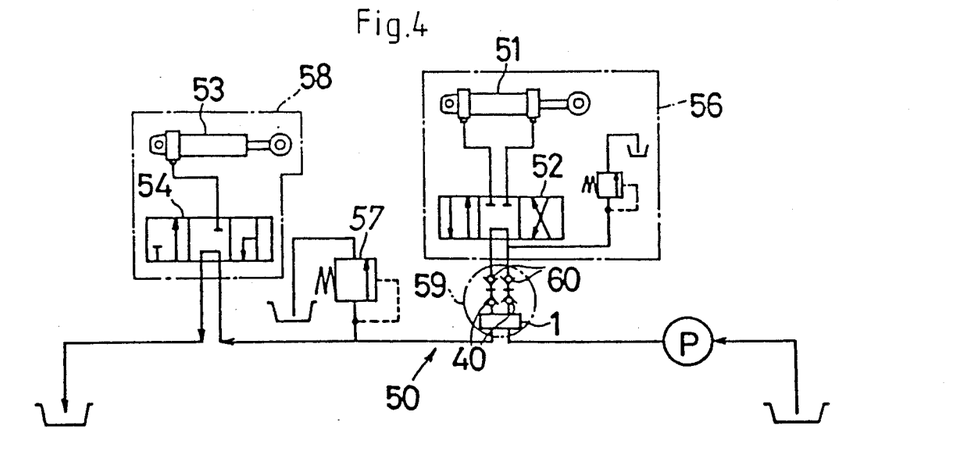
FIG. 4 is a schematic diagram showing a hydraulic system using the self-sealing coupling.

FIG. 1 illustrates a vertical sectional front view showing a self-sealing coupling with a bypass for a hydraulic circuit according to a first embodiment in its disconnected condition, FIG. 2 illustrates a vertical sectional front view showing the self-sealing coupling in its connected condition, FIG. 3 of a vertical sectional front view showing the self-sealing coupling in the process of connection and FIG. 4 of a schematic diagram showing a hydraulic system using the self-sealing coupling, a self-sealing coupling with a bypass for a hydraulic circuit includes a block-like coupling body 1 provided with a pair of self-closing valves 6, 6 fixedly secured thereto.

The coupling body 1 is provided at its left and right portions with valve cases 20, 20 fixedly secured therein 1 extending vertically. An input passage 2 is defined by a center bore of the left valve case 20 and an output passage 3 is defined by the center bore of the right valve case 20. Both these passages 2, 3 are interconnected to each other by a horizontal bypass 10.

The left valve case 20 is formed longer than the right one 20. Within a input passage 2, there are provided the self-closing valve 6 and a bypass valve 11 so as to move simultaneously.

The self-closing valve 6 comprises a valve support member 17 kept slidably in contact with the inner peripheral surface of the input passage 2 near the outlet portion 4 thereof and resiliently urged upward by a valve closing spring 8, a spindle type of valve element 7 fixedly supported on the valve support member 17 standing uprightly and a valve seat 18 formed by diametrally reducing the inner wall of the valve case 20 so as to seat the valve element 7 thereon.

The bypass valve 11 comprises a cylindrical valve element 12 externally fixed fitted at its upper portion around the valve support member 17 and a communication hole 15 opened in the cylindrical valve element 12. The cylindrical valve element 12 is provided to be reciprocatively slidable in the input passage 2.

In this case, the self-closing valve 6 and the bypass valve 11 are adapted to be opened and closed reversely.

That is, under the self-closing valve closed condition in which the self-closing valve element 7 is seated on the valve seat 18 by means of resilient force of the valve closing spring 8, so as to close the valve port 14 defined between the valve element 7 and the valve seat 18, the cylindrical valve element 12 of the bypass valve 11 is slid upward so as to communicate the communication hole 15 to the bypass 10 and to attain the bypass valve opened condition.

To the contrary, under the self-closing valve opened condition in which the self-closing valve element 7 is pushed back inwardly by an external force (for example, a pushing force transmitted through a self-closing valve on the sub-circuit side), so as to open the valve port 14, the cylindrical valve element 12 is slid downward so that the communication hole 15 doesn't meet with the bypass 10 to attain the bypass closed condition.

The right valve case 20 is formed shorter than the left one and is provided with the self-closing valve 6 only. The right self-closing valve 6 comprises a valve support member 17 fixedly secured in contact to the inner peripheral surface of the output passage 3 near the outlet portion 5 thereof, a spindle type of valve element 7 provided to be slidable in the bore of the valve support member 17 and resiliently urged upward by a valve closing spring 8 and a valve seat 18 formed by diametrally reducing the inner wall of the valve case 20 so as to seat the valve element 7 thereon.

In this case, the leading end portion of the valve element 7 on the input passage side is extended longer than that of the valve element 7 on the output passage side.

Both the valve cases 20, 20 are provided with fitting portions 21, 21 formed by diametrally reducing the upper portions thereof, stoppers 22, 22 formed by diametrally expanding the midway portions thereof and self-closing grooves 23, 23 formed by partial-spherically concaving the circumferential portions below the stoppers 22, 22.

Symbol 24 designates support holes for use in mounting the coupling body 1, for example to a tractor body.

The actual manner of use and the functions of the self-sealing coupling with the bypass for the hydraulic circuit will now be explained in combination.

FIG. 4 is a schematic diagram showing an actual hydraulic system in a case where the self-sealing coupling is applied to an agricultural tractor.

The exemplary agricultural tractor is provided detachably at its front half portion with a hydraulic loader and is provided at its back half portion with its own working machine.

The hydraulic loader is adapted to be driven through a flow changeover valve 52 by a loader side actuator 51 such as an arm cylinder, a dump cylinder and the like, and the working machine of the tractor is adapted to be driven by a working machine side actuator 53 through a flow change over valve 54 mounted on the tractor.

A hydraulic device 50 for actuating the loader and the working machine comprises, as shown in FIG. 4, a pressure oil pump P, the hydraulic sub-circuit 56 on the loader side, a relief valve 57 on the working machine side and the hydraulic main circuit 58 of the tractor's own which are connected in tandem with one another.

Incidentally, in the case that the tractor side relief valve 57 is interposed between the pressure oil pump P and the hydraulic sub-circuit 56, a main relief valve within the hydraulic sub-circuit 56 may become unnecessary.

The hydraulic loader is provided with the hydraulic sub-circuit 56, the tractor body is provided with the hydraulic main circuit 58 and the like, except that the sub-circuit 56, and an oil supply and stop device 59 comprising the self-sealing coupling 40 with the bypass for the hydraulic circuit and the self-sealing coupling 60 on the loader side is interposed between the sub-circuit 56 and the main circuit 58.

While the self-sealing coupling 40 is fixedly secured to the tractor body, hydraulic pipings from the tractor body side are connected to threaded holes 25 provided in the lower end portions of the valve cases 20.

The manner of using the oil supply and stop device 59 will be explained hereinafter.

(a) In the case that an operator removes the loader from the tractor and uses the working machine mounted at the back half portion of the tractor, the self-sealing coupling 60 on the loader side is separated and the self-sealing coupling 40 with the bypass (namely, on the working machine side) is changed over to the disconnected condition.

(b) When the operator uses the loader, the self-sealing coupling 60 on the loader side is fitted in the self-sealing coupling 40 on the working machine side so that the loader can be mounted to the tractor and thus the coupling 40 on the working machine side is changed over to the connected condition.

In this case, the self-sealing coupling 60 on the loader side is provided with a pair of self-closing valves 30, 30 for the input side and the output side, and these are integrally combined by a connecting and disconnecting manipulation handle 28.

Each self-closing valve 30 comprises, similar to the self-closing valve 6 on the output passage side of the self-sealing coupling on the working machine side, a valve support member 32 fixedly secured in contact to an inner peripheral surface of a center oil passage of a valve case 31, a spindle type of valve element 34 provided to be slidable in the bore of the valve support member 32 and resiliently urged downward by a valve closing spring 33 and a valve seat 35 for the valve element 34.

Symbol 29 designates a self-closing valve port defined between the valve element 34 and the valve seat 35.

In the leading end portion of the valve case 31, there are provided a plurality of lateral holes 36 spaced apart circumferentially and having partial-spherical configurations. Each lateral hole 36 is provided with a ball 37 movable radially. A cylindrical sleeve 38 is externally fitted around the outer periphery of the valve case 31 so as to be vertically movable with a resilient spring 39 interposed therebetween. A tapered portion 41 is formed in the inner periphery of the leading end portion of the sleeve 38 so that the balls 37 can be moved radially outwardly within the lateral holes 36 along the tapered portion 41.

Symbol 44 designates a stopper for preventing the sleeve 38 from dropping off, and symbol 43 designates a pulling out manipulation handle fixedly secured to the sleeve 38.

In this case, as shown in FIG. 1, the leading end portion of the left valve element 34 on the input side is longer than that of the right valve element 34 on the output side.

As a result, when the self-sealing coupling 60 on the loader side is connected to the self-sealing coupling 40 on the working machine side, as shown in FIG. 3, first the self-closing valve elements 7, 34 on the input passage sides strike each other so as to open the valve ports 14, 29 early because the valve opening and closing strokes of the valve elements 7, 34 on the input passage sides are settled longer than those on the output passage sides. Thereafter, the communication hole 15 provided in the cylindrical valve element 12 on the working machine side is shut off from the bypass 10, and finally the self-closing valve elements 7, 34 on the output passage sides strike each other so as to open the valve ports 14, 29.

The functions of the self-sealing coupling 40 with the bypass for the hydraulic circuit will be explained hereinafter.

(a) In the case that an operator uses only the main circuit 58 of the hydraulic device to manipulate only the working machine on the tractor side, the self-closing valve elements 7 are pushed back outward by means of the resilient force of the valve closing spring 8 so as to be seated on the valve seats 18 and to close the valve ports 14 in both the input passage 2 and the output passage 3 because the self-sealing coupling 40 on the working machine side is in a disconnected condition in which it is separated from the coupling on the loader side (refer to FIG. 1).

Further, since the cylindrical valve element 12 is also pushed back outward by the valve closing spring 8 so as to connect the communication holes 15 to the bypass 10, the input passage 2 and the output passage 3 are connected through the bypass 10.

As a result, pressurized oil flows from the input passage 2 to the main circuit 58 through the bypass 10 and the output passage 3, so as to enable only the tractor working machine to be driven.

(b) When the self-sealing coupling 60 on the loader side is connected to the self-sealing coupling 40 on the working machine side in order to operate the loader, first the valve case 31 of the self-sealing coupling 60 on the loader side is externally fitted onto the fitting port 21 provided in the leading end portion of the valve case 20 of the self-sealing coupling 40 on the working machine side and then the self-closing valve element 34 on the loader side pushes down the valve element 7 on the working machine side against the resilient force of the valve closing spring 8 so that the balls 37 provided in the valve case 31 are fitted into the self-closing groove 23 formed in the fitting portion 21 and the setting of both couplings is completed (refer to FIG. 2).

Thereupon, the cylindrical valve element 12 is moved inwardly within the input passage 2 so as to disconnect the communication hole 15 from the bypass 10 and to shut off the input passage 2 from the output passage 3.

Furthermore, since the balls 37 are fitted into the self-closing groove 23 and moved radially inwardly, the balls 37 retained by the tapered portion 41 are disengaged therefrom and then the sleeve 38 is pushed downward by a resilient spring 39.

Consequently pressurized oil delivered from the pressure oil pump P flows from the input passage 2 on the working machine side to the main circuit 58 through the output portion 4 of the input passage 2, the input passage on the loader side, the sub-circuit 56 thereon, the output passage thereon, the inlet portion 5 of the output passage 3 and the output passage 3 on the working machine side, so that both the working machine and the loader can be operated simultaneously.

However, since the self-closing valve elements 7, 34 on the input passage side are shifted to the open position before the closing of the bypass 10 as the valve element 7 is pushed down as mentioned above, the oil stored within the input passage 2 can be released to either of the working machine side and the loader side through the self-closing valve ports 14, 29 on the input passage side and the oil stored within the output passage 3 can be also released thereto through the bypass 10 and the self-closing valve ports 14, 29 on the input passage side. Therefore, the oils within the respective passages 2, 3 never set the resistance against the pushing down of the self-closing valve element 7 so as to facilitate the connection between both couplings.

On the other hand, since the configurations of the self-closing valves on the input passage side and on the output passage side are different from each other on the working machine side, as well as on the loader side so that the couplings can be connected smoothly only when the input passage sides are opposite to each other and the output passage sides are opposite to each other. This ensures avoidance of connection mistakes as the operator connects the output passage side self-closing valve on the loader side to the input passage side self-closing valve on the working machine side (or acts to connect the input passage side self-closing valve on the loader side to the output passage side self-closing valve on the working machine side).

(c) In the case that the operator disconnects the self-sealing coupling 60 on the loader side from that on the working machine side, when the pulling out manipulation handle 43 provided on the loader side is pushed up relative to the connecting and disconnecting manipulation handle 28, so that the sleeve 38 can be moved upward relative to the valve case 31 on the loader side, the balls 37 subjected to the upwardly pushing force transmitted from the valve closing spring 8 through the valve case 20 on the working machine side are disengaged from the self-closing groove 23 and are retracted radially with being retained by the tapered portion 41 of the sleeve 38.

As a result, the self-sealing coupling 60 on the loader side is removed upward from the self-sealing coupling 40 on the working machine side so as to attain the self-sealed condition.

But, when the operator releases the pulling out manipulation handle 43 attached to the sleeve 38, the sleeve 38 is moved downward by the resilient spring 39 so that the balls 37 are pushed back radially within the self-closing groove 23. Therefore, as shown in FIG. 1, at the time any connecting manipulation, the pulling out manipulation handle 43 is adapted to be pushed up so that the balls 37 can be moved radially outward while being retained by the tapered portion 41.

Figure 5:
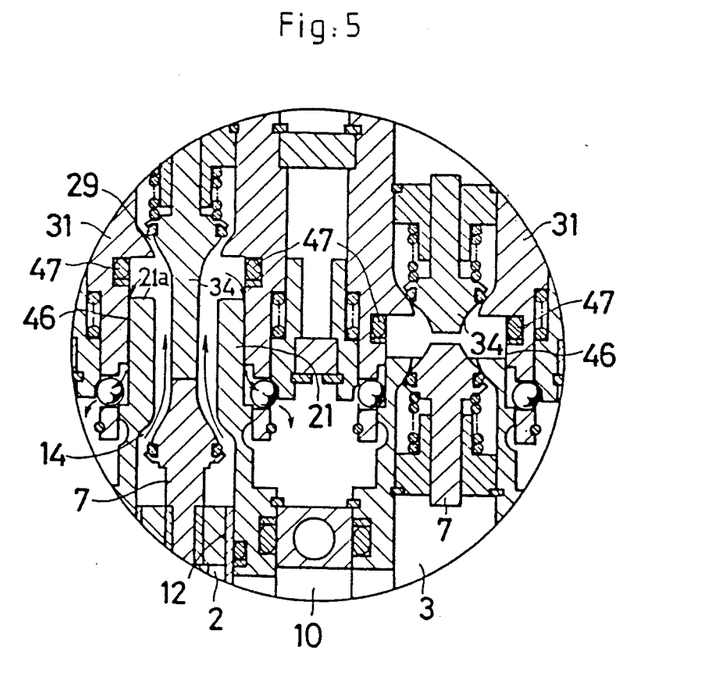
FIG. 5 is a vertical sectional view showing a principal part of a self-sealing coupling of a second embodiment in the process of connection.
Figure 7:
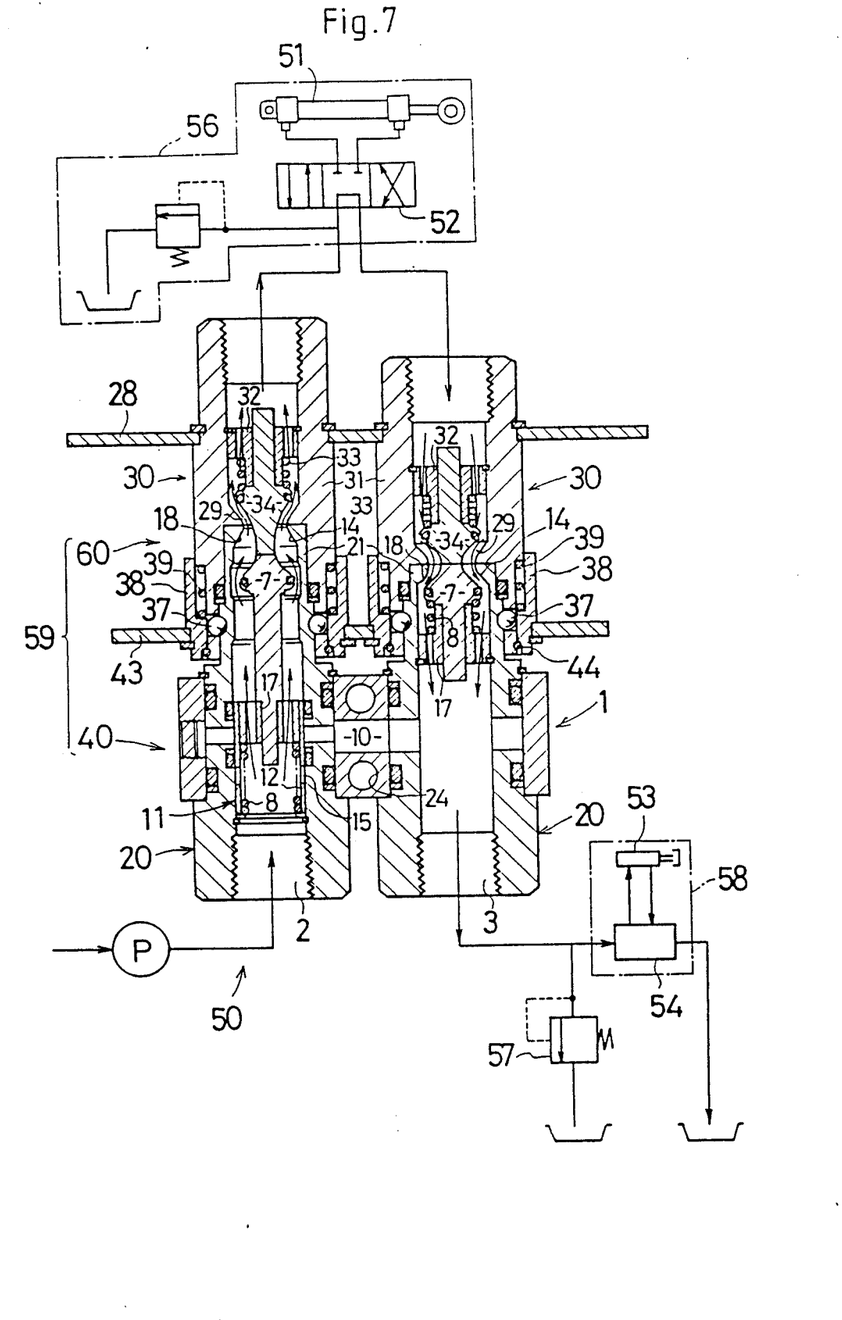
FIG. 7 is a view showing the embodiment corresponding to FIG. 2.

FIGS. 5 through 7 show another embodiment of the present invention, in which the members and the portions having the same functions as those in the first embodiment are designated by the same symbols.

FIG. 5 shows the second embodiment of the present invention, in which a sealing ring 47 is provided in the innermost portion of a support inner wall 46 of the valve case 31 on the loader side near the leading end thereof. The sealing ring 47 is adapted to be brought into contact with the leading end 21a of the fitting portion 21 on the working machine side after the self-closing valve ports 14, 29 on the working machine side and on the loader side are opened.

As a result, the oil stored within the input passage 2 and within the output passage 3 on the working machine is able to leak outside smoothly through the fitting gap between the fitting portion 21 on the working machine side and the support inner wall 46 on the loader side as shown by the arrows during the duration from the start of the valve opening to the completion of the contact with the sealing ring 47.

Thus, in this second embodiment, an operator can connect the couplings smoothly, even when both oil passages on the working machine side and on the loader side are blocked off so that the oil can not flow therethrough.

The third embodiment of the present invention shown in FIGS. 6 and 7 is attained by improving the structures of the valve case 20 and the self-closing valve element 7 on the input passage side (namely, on the left side) of the self-sealing coupling 40 on the working machine side basing on the first embodiment.

In the first embodiment as shown in FIG. 1, since the fitting portion 21 is projected to extend upward, so that the connection leading end opening 72 of the input side valve case 20 (namely, of the fitting portion 21) provided in the self-sealing coupling 40 on the working machine side is spaced apart upward far from the self-closing valve port 14. The fitting portion 21 of the valve case 20 then gets to such a point as to be opened upward when the operator uses the tractor for operating the agricultural machine and the like after separating the self-sealing coupling 40 from the sub-circuit 56. Dust and dirt such as chips of straw and mud, etc. are apt to be attached to and accumulated in the inner space of the fitting portion 21.

Therefore, when the operator connects the self-sealing coupling 60 on the loader side to the coupling 40 on the working machine side, it is apprehended that these accumulated dust and dirt may become entrained with the oil for the hydraulic device 50 and be entangled with the self-closing valves 6, 30, etc., so as to cause problems in the self-sealing couplings 40, 60.

Further, once dust and dirt enter the innermost valve case space within the fitting portion 21, it is difficult to remove the same.

On the contrary, in this third embodiment, the self-closing valve element 7 on the input passage side of the self-sealing coupling 40 on the working machine side is projected to extend from the valve support member 17, and the valve opening and closing stroke of the input passage side self-closing valve 6 is made longer than that of the output passage side valve.

The self-closing valve seat 18 is formed in the leading end portion of the fitting portion 21 of the valve case 20, and the connection leading end opening 72 is located near the self-closing valve port 14.

Thus, the third embodiment differs from the first embodiment in that does not have an inner open space above the valve seat 14 on the input passage side. For example, if the coupling 40 is disconnected from the sub-circuit in order to use only the main circuit for an agricultural work, dust and dirt such as chips of straw and mud, etc., are not easily attached to and accumulated at the connection leading end opening of the self-closing valve and can be removed soon and readily therefrom by means of wiping off.

Accordingly, where an operator connects the self-sealing coupling 40 on the working machine side in its disconnected condition to the self-sealing coupling 60 on the loader side, in order to use the loader, influence of the dust and dirt upon the hydraulic circuit can be suppressed to a minimum and connection problems of the self-sealing coupling can be prevented.

Even if such dust and dirt enter the self-closing valve 6, the amount accumulation thereof within the opening 72 of the self-closing valve 6 is very small. Therefore, there are no problems in the operation of the coupling.

As noted above, since the present invention is characterized in that the structure of the self-sealing coupling is simplified by making the self-closing valve and the bypass valve thereof in common, the bypass valve 11 may be provided in the output passage 3 instead of in the input passage 2.

Although the communication hole 15 for the bypass valve 11 is shown formed as a round hole opened in the midway portion of the cylindrical valve element 12, the communication hole 15 may be replaced by the lower end opening of a short cylindrical valve element formed by cutting off the lower portion of the cylindrical valve element 15. Thereupon, when the self-closing valve 6 is closed, the lower end opening of the short cylindrical valve element can be communicated to the bypass 10. When the self-closing valve 6 is opened, the lower end opening thereof is shut off from the bypass 10.

On the other hand, the self-sealing coupling is not restricted to the quick disconnect coupling as disclosed in the above-mentioned embodiments but may be of a screwed in type.

Even in the quick disconnect coupling of a type that is freely connected and disconnected by shifting the sleeve upward, per the above-mentioned embodiment, the present invention is not restricted thereto but may be applicable to various types of couplings according to the purposes for which it is used.

It will be apparent, however, to those skilled in the art that many modifications and changes in the couplings set forth will be possible without departing from the scope and spirit of the invention.

What is claimed is:

1. A self-sealing coupling with a bypass for a hydraulic circuit, comprising:

a coupling body, provided with an input passage and an output passage separate from each other;

self-closing valves, respectively provided in an outlet portion of said input passage and in an inlet portion of said output passage, each of said self-closing valves comprising a valve closing force exerting means for urging a valve element outwardly to close a valve port, said valve element being formed and disposed to be pushed back inwardly by an external force so as to open the valve port; and a bypass valve adapted to open and close a bypass provided between said input passage and said output passage for connecting the same, the coupling being characterized in that said bypass valve is provided with a cylindrical valve element which is reciprocatively slidable within one of said input passage and said output passage to open and close a communication hole provided between said one passage and said bypass, said cylindrical valve element is movable with the self-closing valve element provided in said one passage, to be shifted to a bypass valve opening position where the communication hole is opened in a valve closed condition in which said one self-closing valve element is pushed outwardly by the valve closing force exerting means to close said one self-closing valve port and to be shifted to a bypass valve closing position, where the communication hole is closed, in a valve opened condition in which said one self-closing valve element is pushed back inwardly by an external force so as to open the one self-closing valve port, and the valve opening and closing stroke of said one self-closing valve element and the cylindrical valve element is selected to be larger than a corresponding valve opening and closing stroke of the other self-closing valve element.

2. A self-sealing coupling with a bypass for a hydraulic circuit according to claim 1, wherein:

a connection leading end opening of said input passage is spaced apart upward and distant from a valve port of the self-closing valve on the main circuit side, and the valve opening and closing stroke of the self-closing valve element and the cylindrical valve element in the input passage is selected to be longer than that of the self-closing valve element in the output passage.

3. A self-sealing coupling with a bypass for a hydraulic circuit according to claim 1, wherein:

sealing members are provided in fitting contact surfaces of the respective connection portions of the input passage and the output passage so as to be brought into sealing contact with corresponding valve elements, and oil from within the input passage and the output passage is discharged to external oil passages through the self-closing valve ports in the course of connecting the coupling.

4. A self-sealing coupling with a bypass for a hydraulic circuit according to claim 2, wherein:

sealing members are provided in fitting contact surfaces of the respective connection portions of the input passages and the output passage so as to be brought into sealing contact with corresponding valve elements, and oil from within the input passage and the output passage is discharged to external oil passages through the self-closing valve ports in the course of connecting the coupling.

5. A self-sealing coupling with a bypass for a hydraulic circuit according to claim 1, wherein:

fitting gaps are provided on the fitting contact surfaces of respective connection portions of the input passage and the output passage during a connected condition thereof, and oil from within the input passage and the output passage is discharged outside the coupling through the self-closing valve ports and the fitting gaps in the course of connecting the coupling.

6. A self-sealing coupling with a bypass for a hydraulic circuit according to claim 2, wherein:

fitting gaps are provided on the fitting contact surfaces of respective connection portions of the input passage and the output passage during a connected condition thereof, and oil from within the input passage and the output passage is discharged outside the coupling through the self-closing valve ports and the fitting gaps in the course of connecting the coupling.

7. A self-sealing coupling with a bypass for a hydraulic circuit according to claim 1, wherein:

respective connection leading end openings of the input passage and of the output passage are located adjacently to the corresponding valve ports of the self-closing valves on the main circuit side.

* * * * *